United States Patent
Gangundi et al.

(10) Patent No.: US 11,107,227 B1
(45) Date of Patent: Aug. 31, 2021

(54) OBJECT DETECTION BASED ON THREE-DIMENSIONAL DISTANCE MEASUREMENT SENSOR POINT CLOUD DATA

(71) Applicant: GM Cruise Holdings LLC, San Francisco, CA (US)

(72) Inventors: Sandeep Gangundi, Milpitas, CA (US); Sarthak Sahu, Palo Alto, CA (US); Nathan Harada, San Francisco, CA (US); Phil Ferriere, Palo Alto, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 0 days.

(21) Appl. No.: 16/795,129

(22) Filed: Feb. 19, 2020

(51) Int. Cl.
*G06T 7/50* (2017.01)
*G06T 15/08* (2011.01)
*G06K 9/00* (2006.01)
*G01S 15/89* (2006.01)
*G01S 13/89* (2006.01)
*G01S 17/89* (2020.01)

(52) U.S. Cl.
CPC ............ *G06T 7/50* (2017.01); *G06K 9/00805* (2013.01); *G06T 15/08* (2013.01); *G01S 13/89* (2013.01); *G01S 15/89* (2013.01); *G01S 17/89* (2013.01); *G06T 2200/04* (2013.01); *G06T 2207/10028* (2013.01); *G06T 2207/30261* (2013.01)

(58) Field of Classification Search
CPC ....... G06T 7/50; G06T 15/08; G06T 2200/04; G06T 2207/10028; G06T 2207/30261; G06K 9/00805; G01S 15/89; G01S 13/89; G01S 17/89
See application file for complete search history.

(56) References Cited

U.S. PATENT DOCUMENTS

2018/0232947 A1* 8/2018 Nehmadi .............. G01S 17/931

OTHER PUBLICATIONS

Yew, Z., Lee, G., 3DFeat-Net: Weakly Supervised Local 3D Features for Point Cloud Registration, Oct. 2018, European Conference on Computer Vision ECCV 2018, pp. 1-17. (Year: 2018).*

* cited by examiner

*Primary Examiner* — Said Broome
(74) *Attorney, Agent, or Firm* — Polsinelli, PC

(57) ABSTRACT

Distance measurements are received from one or more distance measurement sensors, which may be coupled to a vehicle. A three-dimensional (3D) point cloud are generated based on the distance measurements. In some cases, 3D point clouds corresponding to distance measurements from different distance measurement sensors may be combined into one 3D point cloud. A voxelized model is generated based on the 3D point cloud. An object may be detected within the voxelized model, and in some cases may be classified by object type. If the distance measurement sensors are coupled to a vehicle, the vehicle may avoid the detected object.

19 Claims, 8 Drawing Sheets

OBJECT DETECTION BASED ON THREE-DIMENSIONAL DISTANCE MEASUREMENT SENSOR POINT CLOUD DATA

TECHNICAL FIELD

The present invention generally pertains to object detection. More specifically, the present invention pertains to object detection based on three-dimensional point cloud data from one or more distance measurement sensors of a vehicle.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Such sensors may also be mounted on other vehicles, such as vehicles that are used to generate or update street maps as they drive.

In some cases, sensor data from a single sensor may be inaccurate. For example, a sensor's data may indicate the presence of an obstacle that is not actually present, which may be referred to as a false positive. Likewise, a sensor's data may fail to indicate the presence of an obstacle that is actually present, which may be referred to as a false negative. Accurate object detection can be hampered by both false positives and false negatives, which may in some cases be caused by occlusions, weather, sensor defects, or improper sensor calibration. Inaccurate object detection from sensor data of sensors coupled to vehicles can cause vehicular accidents, either because the vehicle failed to avoid an obstacle or performed a dangerous maneuver trying to avoid a "phantom" obstacle that did not actually exist. Such vehicular accidents may can serious injuries, such as whiplash or herniation, and may even cause death, for occupants of the vehicle, for occupants of nearby vehicles, and for nearby pedestrians.

Improving accuracy of object detection by sensors coupled to vehicles would result in improvements in safety to drivers, passengers, and pedestrians.

SUMMARY

Techniques and systems are described herein for object detection based on three-dimensional point cloud data from one or more distance measurement sensors of a vehicle.

In another example, a method of object detection is provided. The method includes receiving a plurality of distance measurements from one or more distance measurement sensors. In some cases, the one or more distance measurement sensors may be coupled to a vehicle. The method also includes generating a three-dimensional point cloud including a plurality of points in a volume of space within a radius around the one or more distance measurement sensors. Each of the plurality of points in the three-dimensional point cloud corresponds to one of the plurality of distance measurements. The method also includes generating a voxelized model of the volume of space based on the three-dimensional point cloud. The voxelized model includes a plurality of voxels positioned based on the plurality of points in the three-dimensional point cloud. The method also includes detecting an object within the voxelized model.

In one example, a system for object detection is provided. The system is coupled to a first device. The system includes one or more distance measurement sensors that measure a plurality of distance measurements. The system also includes a memory storing instructions and a processor that executes the instructions. Execution of the instructions by the processor causes the processor to perform system operations. The system operations include receiving the plurality of distance measurements from the one or more distance measurement sensors. The system operations also include generating a three-dimensional point cloud including a plurality of points in a volume of space within a radius around the one or more distance measurement sensors. Each of the plurality of points in the three-dimensional point cloud corresponds to one of the plurality of distance measurements. The system operations also include generating a voxelized model of the volume of space based on the three-dimensional point cloud. The voxelized model includes a plurality of voxels positioned based on the plurality of points in the three-dimensional point cloud. The system operations also include detecting an object other than the one or more distance measurement sensors within the voxelized model.

In another example, a non-transitory computer readable storage medium is provided. The non-transitory computer readable storage medium has embodied thereon a program that is executable by a processor to perform a method of object detection. The method includes receiving a plurality of distance measurements from one or more distance measurement sensors. The method also includes generating a three-dimensional point cloud including a plurality of points in a volume of space within a radius around the one or more distance measurement sensors. Each of the plurality of points in the three-dimensional point cloud corresponds to one of the plurality of distance measurements. The method also includes generating a voxelized model of the volume of space based on the three-dimensional point cloud. The voxelized model includes a plurality of voxels positioned based on the plurality of points in the three-dimensional point cloud. The method also includes detecting an object other than the one or more distance measurement sensors within the voxelized model.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Distance measurements are received from one or more distance measurement sensors, which may be coupled to a vehicle. A three-dimensional (3D) point cloud are generated based on the distance measurements. In some cases, 3D point clouds corresponding to distance measurements from different distance measurement sensors may be combined into one 3D point cloud. A voxelized model is generated based on the 3D point cloud. An object may be detected within the voxelized model, and in some cases may be classified by object type, for example based on whether the object is a pedestrian, a bicycle, an automobile, a tree, a lamp post, and so forth. In cases in which the distance measurement sensors are coupled to a vehicle, the vehicle may then navigate and/or route its driving by generating a route that avoids the detected object.

The disclosed technologies and techniques address a need in the art for improvements to vehicle safety technologies. Vehicular accidents are a major safety issue for vehicles, and particularly for autonomous vehicles that are in charge of safe navigation. Object recognition based on images gathered from a camera may be useful in detecting objects, such as pedestrians or other vehicles, and routing the vehicle safely. Object recognition based on distance measurement sensors, such as light detection and ranging (LIDAR) sensors, may provide more detailed information about the object and its boundaries, and may be able to be performed more quickly in some cases. This may prevent vehicular accidents, such as vehicular collisions, and may ultimately prevent injuries and save lives.

Figure 1:
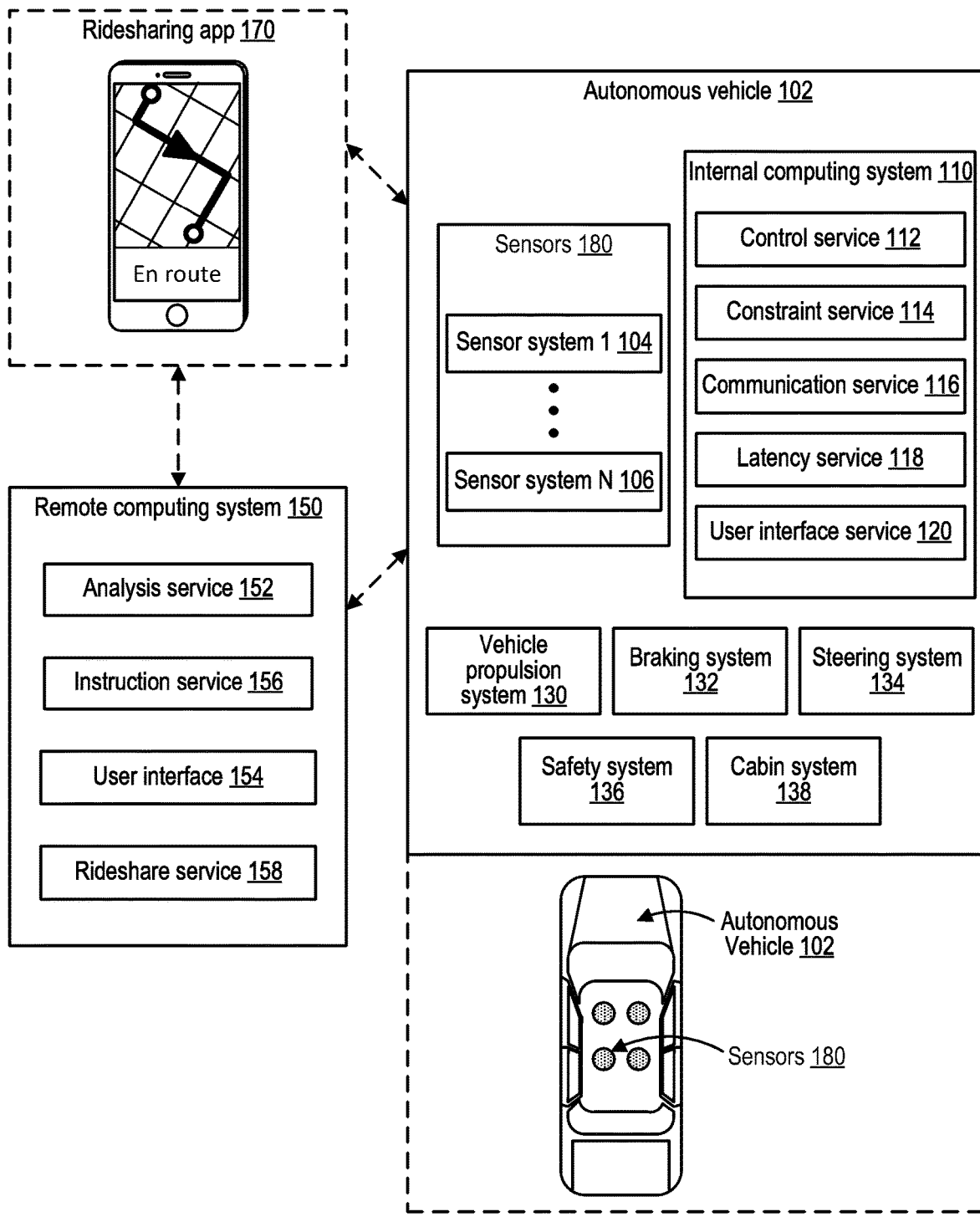
FIG. 1 illustrates an autonomous vehicle and remote computing system architecture.

FIG. 1 illustrates an autonomous vehicle and remote computing system architecture.

The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The internal computing system 110 may include one or more computing systems 2200, or may include at least a subset of components discussed with respect to the computing system 2200. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The internal computing system 110 can, in some cases, include at least one computing system 1500 as illustrated in or discussed with respect to FIG. 15, or may include at least a subset of the components illustrated in FIG. 15 or discussed with respect to computing system 1500.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

Figure 8:
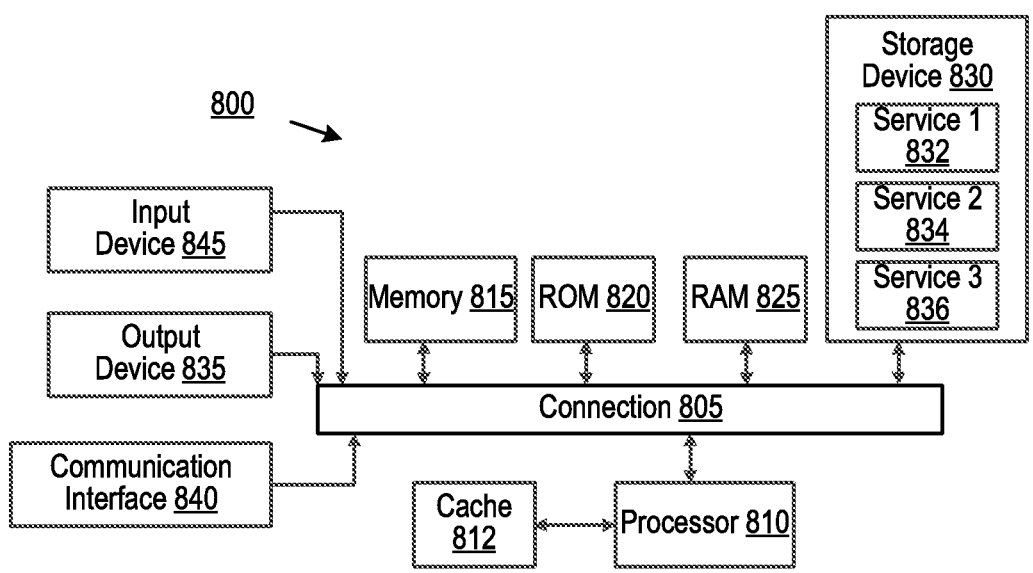
FIG. 8 illustrates an example of a system for implementing certain aspects of the present technology.

The remote computing system 150 can, in some cases, include at least one computing system 800 as illustrated in or discussed with respect to FIG. 8, or may include at least a subset of the components illustrated in FIG. 8 or discussed with respect to computing system 800.

Figure 2:
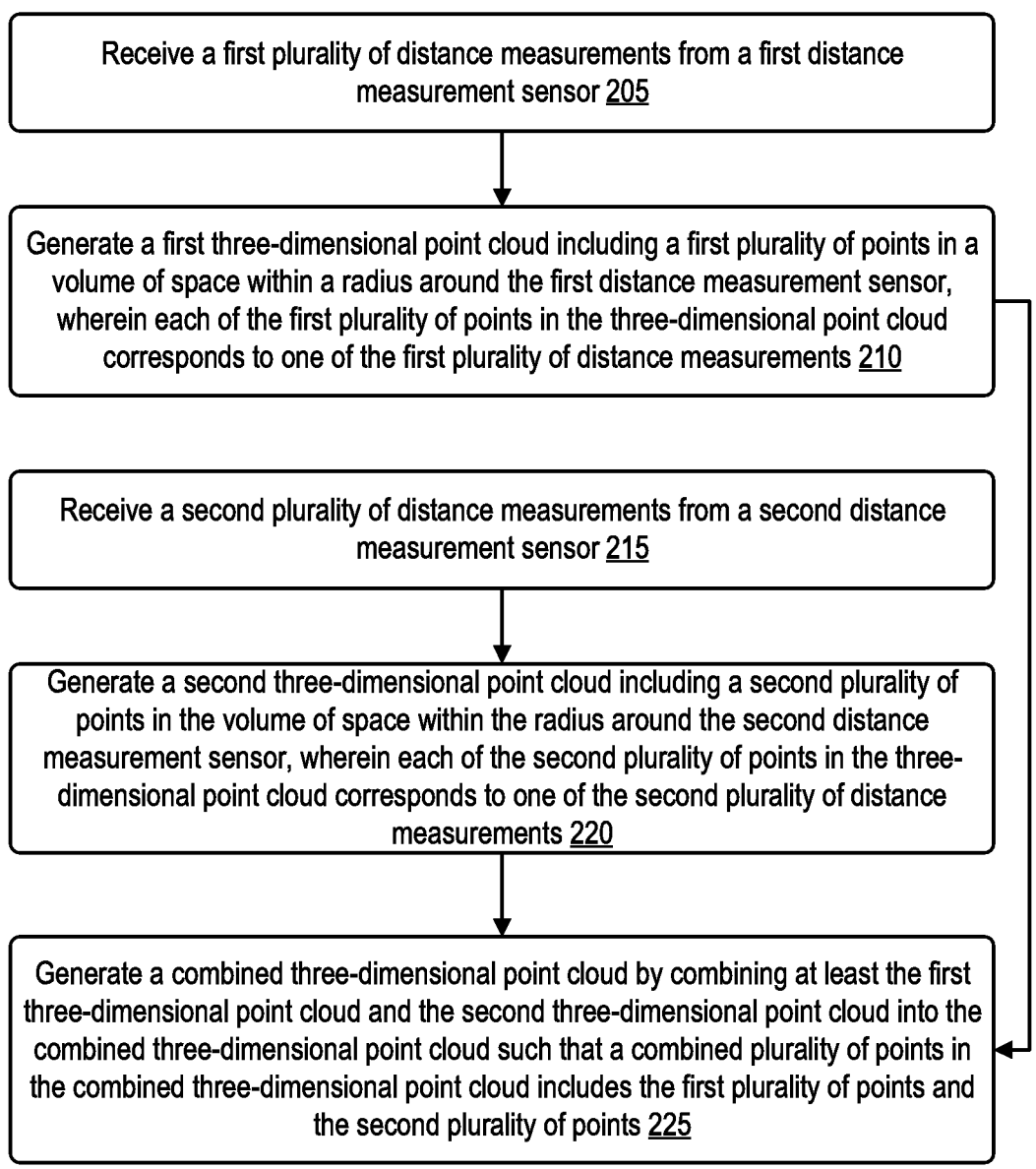
FIG. 2 is a flow diagram illustrating techniques for combining point cloud data.

FIG. 2 is a flow diagram illustrating techniques for combining point cloud data.

The flow diagram 200 of FIG. 2 illustrates a process for combining point cloud data from multiple distance measurement sensors coupled to a device, which may be a vehicle, such as the vehicle 102 of FIG. 1 or another type of vehicle. The process may be performed by a system that may include this device, any combination of sensors and/or other components or systems discussed with respect to the one or more sensors 180, the internal computing device 110, additional computing devices 800 inside or coupled to the vehicle 102 of FIG. 1, other systems or components inside or coupled to the vehicle 102 of FIG. 1, systems or components inside or coupled to the vehicle 405 of FIG. 4, or some combination thereof. In the context of the process illustrated in the flow diagram 200 of FIG. 2, the sensors 180 includes multiple distance measurement sensors, including at least a first distance measurement sensor and a second distance measurement sensor. Distance measurement sensors may include, for example LIDAR sensors, RADAR sensors, SONAR sensors, SODAR sensors, EmDAR sensors, laser rangefinders, or some combination thereof.

At step 205, the system receives a first plurality of distance measurements from the first distance measurement sensor. In some cases, the first distance measurement sensor may be coupled to a vehicle 102 or another device. At step 210, the system generates a first three-dimensional (3D) point cloud including a first plurality of points in a volume of space within a radius around the first distance measurement sensor. Alternately, if the first distance measurement sensor is coupled to a vehicle 102 or other device, the radius may be a radius around the vehicle or other device. Each of the first plurality of points in the first 3D point cloud corresponds to one of the first plurality of distance measurements. The first plurality of points in the first 3D point cloud may each have coordinates in 3D space (e.g., X, Y, and Z coordinates). Each point in the first plurality of points in the first 3D point cloud may be generated based on the location of the first distance measurement sensor at a given time, the angle that the first distance measurement sensor is facing (and/or the angle of its transmitted and/or received signals) at the given time, and the distance measurement corresponding to the given time.

At step 215, the system receives a second plurality of distance measurements from the second distance measurement sensor. In some cases, the second distance measurement sensor may be coupled to a vehicle 102 or another device. At step 220, the system generates a second 3D point cloud including a second plurality of points in the volume of space within the radius around the second distance measurement sensor. Alternately, if the second distance measurement sensor is coupled to a vehicle 102 or other device, the radius may be a radius around the vehicle or other device. Each of the second plurality of points in the second 3D point cloud corresponds to one of the second plurality of distance measurements. Each point in the second plurality of points in the second 3D point cloud may be generated based on the location of the second distance measurement sensor at a given time, the angle that the second distance measurement sensor is facing (and/or the angle of its transmitted and/or received signals) at the given time, and the distance measurement corresponding to the given time.

At step 225, the system generates a combined 3D point cloud by combining at least the first 3D point cloud and the second 3D point cloud into the combined 3D point cloud such that a combined plurality of points in the combined 3D point cloud includes at least the first plurality of points and the second plurality of points.

Steps 205 and 210 may occur in any sequence, or in parallel with, steps 215 and 220. Likewise, additional distance measurement sensors, such as a third distance measurement sensors, fourth distance measurement sensor, and so forth, may be used to receive additional distance measurements based upon which the system may generate additional 3D point clouds that are combined with the first and second 3D point clouds to form the combined 3D point cloud at step 225.

The combined 3D point cloud may be more reliable than either the first 3D point cloud or the second 3D point on their own. For example, if the first 3D point cloud includes a false positive reading suggesting detection/presence of a phantom object that does not actually exist, the second 3D point cloud likely will not include the same false positive reading. Thus, the combined 3D point cloud will include densely packed points where real objects are present, and will only include sparse points, or no points at all, where either of the first or second 3D point clouds includes a false positive. Similarly, if the first 3D point cloud includes a false negative reading that fails to detect an existing object, the second 3D point cloud likely will not include the same false negative reading. Thus, even if one of the distance measurement sensors fails to detect a real object, the object will still appear in the combined 3D point cloud. Adding additional distance measurement sensors to the process, and therefore combining additional 3D point clouds to form the combined 3D point cloud, increases the accuracy and reliability of the 3D point cloud. Any number of distance measurement sensors may be used. In some cases, five distance measurement sensors may be used.

In some cases, combining the first 3D point cloud and the second 3D point cloud into the combined 3D point cloud may include calculating an offset distance and offset angle based on a distance and angle between the first distance measurement sensor and the second distance measurement sensor. Combining the first 3D point cloud and the second 3D point cloud into the combined 3D point cloud may further include offsetting the points of one of the 3D point clouds relative to the other based on the offset distance. For example, if the second distance measurement sensor is located 2 feet to the right of the first distance measurement sensor, then every point in the second plurality of points in the second 3D point cloud may be shifted to the left by 2 feet, after which the resulting modified second 3D point cloud may simply be overlaid over the first 3D point cloud in order to form the combined 3D point cloud.

In some cases, combining the first 3D point cloud and the second 3D point cloud into the combined 3D point cloud may include distorting, distortion-correcting, warping, warp-correcting, or otherwise transforming first 3D point cloud and/or the second 3D point cloud before combining at least these 3D point clouds. For example, this transformation may include performing barrel distortion correction, if one distance measurement sensor (but not the other distance measurement sensor) includes a wide-angle lens, fisheye lens, or other type of component that causes straight lines to appear curved in the 3D point cloud.

Figure 3:
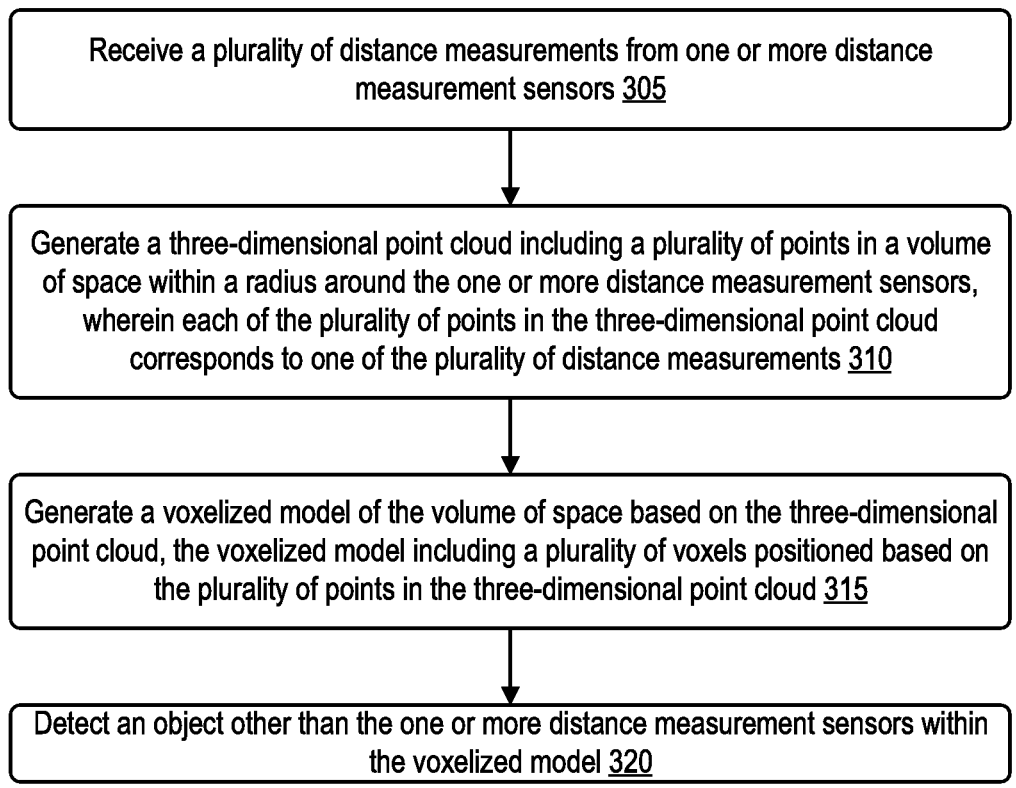
FIG. 3 is a flow diagram illustrating techniques for object detection.

FIG. 3 is a flow diagram illustrating techniques for object detection.

The flow diagram 300 of FIG. 3 illustrates a process for object detection based on data from multiple distance measurement sensors coupled to a device. As with the device discussed in the flow diagram 200 of FIG. 2, the device discussed in the flow diagram 300 of FIG. 3 may be the vehicle 102 of FIG. 1, or another type of vehicle. The process may be performed by a system that may include this device, any combination of sensors sensors and/or other components or systems discussed with respect to the one or more sensors 180, the internal computing device 110, additional computing devices 800 inside or coupled to the vehicle 102 of FIG. 1, other devices or components inside or coupled to the vehicle 102 of FIG. 1, systems or components inside or coupled to the vehicle 405 of FIG. 4, or some combination thereof. In the context of the process illustrated in the flow diagram 300 of FIG. 3, the sensors 180 include one or more distance measurement sensors, which may include, for example LIDAR sensors, RADAR sensors, SONAR sensors, SODAR sensors, EmDAR sensors, laser rangefinders, or some combination thereof.

At step 305, the system receives a plurality of distance measurements from one or more distance measurement sensors. At step 310, the system generates a three-dimensional (3D) point cloud including a plurality of points in a volume of space within a radius around the one or more distance measurement sensors. Alternately, if the one or more distance measurement sensors are coupled to a vehicle 102 or other device, the radius may be a radius around the vehicle or other device. Each of the plurality of points in the 3D point cloud corresponds to one of the plurality of distance measurements. The plurality of points in the 3D point cloud may each have coordinates in 3D space (e.g., X, Y, and Z coordinates). Each point in the plurality of points in the first 3D point cloud may be generated based on the location of a distance measurement sensor at a given time, the angle that the distance measurement sensor is facing (and/or the angle of its transmitted and/or received signals) at the given time, and the distance measurement corresponding to the given time.

In some cases, the 3D point cloud of step 310 may be the combined 3D point cloud of step 225. That is, step 305 may include steps 205 and 215, and step 310 may include steps 210, 220, and 225. In other cases, the 3D point cloud of step 310 may be a 3D point cloud from a single distance measurement sensor, such as the first 3D point cloud of step 210 or the second 3D point cloud of step 220.

The radius may correspond to a range of at least one of the one or more distance measurement sensors. In some cases, the 3D point cloud may be cropped into a rectangular prism or a cube rather than a sphere or portion of a sphere.

At step 315, the system generates a voxelized model of the volume of space based on the three-dimensional point cloud. The voxelized model includes a plurality of voxels positioned based on the plurality of points in the three-dimensional point cloud. Each voxel of the plurality of voxels in the voxelized model corresponds to one or more of the plurality of points in the 3D point cloud. Each vertex of each voxel of the plurality of voxels in the voxelized model may have coordinates in 3D space (e.g., X, Y, and Z coordinates).

Each voxel of the plurality of voxels may be a three-dimensional (3D) polyhedral shape. Each voxel in the voxelized model may be arranged in spaces of a three-dimensional (3D) polyhedral lattice or grid. In some cases, a certain threshold number of points may need to be present within a 3D lattice/grid space for a voxel to be generated in that 3D lattice/grid space. For example, a 3D lattice/grid space with only one point in the 3D point cloud might be a false positive, and therefore a voxel may be not generated in that 3D lattice/grid space. On the other hand, a lattice/grid space with five points in the 3D point cloud is unlikely to be a false positive, and therefore a voxel may be generated in that 3D lattice/grid space. The threshold number of points may vary, for example depending on the size of the 3D lattice/grid spaces (and therefore the voxels), but may be, for example, 1, 2, 3, 4, 5, 6, 7, 8, 9, 10, 11, 12, 13, 14, 15, 16, 17, 18, 19, 20, 21, 22, 23, 24, or 25 points. The size of each side/dimension of the 3D each lattice/grid space, and therefore of each voxel, may for example be 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 41 cm, 42 cm, 43 cm, 44 cm, 45 cm, 46 cm, 47 cm, 48 cm, 49 cm, 50 cm, 51 cm, 52 cm, 53 cm, 54 cm, 55 cm, 56 cm, 57 cm, 58 cm, 59 cm, 60 cm, 61 cm, 62 cm, 63 cm, 64 cm, 65 cm, 66 cm, 67 cm, 68 cm, 69 cm, 70 cm, 71 cm, 72 cm, 73 cm, 74 cm, 75 cm, 76 cm, 77 cm, 78 cm, 79 cm, 80 cm, 81 cm, 82 cm, 83 cm, 84 cm, 85 cm, 86 cm, 87 cm, 88 cm, 89 cm, 90 cm, 91 cm, 92 cm, 93 cm, 94 cm, 95 cm, 96 cm, 97 cm, 98 cm, 99 cm, 100 cm, a size greater than 100 cm, or a size between any two of the sizes listed herein. The sides/dimension of each 3D each lattice/grid space, and therefore of each voxel, need not be equal in length. For example, the height of a voxel may have a different size than the length of the voxel, the height of the voxel may have a different size than a depth of the voxel, the length of the voxel may have a different size than the depth of the voxel, or some combination thereof.

Each voxel of the plurality of voxels (and therefore each 3D lattice/grid space of the 3D lattice/grid) may be a three-dimensional polyhedral shape. In some cases, each voxel (and therefore each 3D lattice/grid space) may be a regular three-dimensional polyhedral shape, such as a cube. In some cases, each voxel may be a rectangular prism. In some cases, each voxel may be a three-dimensional polyhedral shape that is regular, platonic, quasi-regular, semi-regular, uniform, isogonal, isotoxal, isohedral, noble, or some combination thereof, or none of these. In some cases, one or more of the faces of the three-dimensional polyhedral shape of each voxel may be planar, and one or more of the edges of the three-dimensional polyhedral shape of each voxel may be straight. In some cases, one or more of the faces of the three-dimensional polyhedral shape of each voxel may be concave, convex, or otherwise curved. Similarly, in some cases, one or more edges of the three-dimensional polyhedral shape of each voxel may be concave, convex, or otherwise curved.

The radius may correspond to a range of at least one of the one or more distance measurement sensors. In some cases, the voxelized model may be cropped into a rectangular prism or a cube rather than a sphere or portion of a sphere.

At step 320, the system detects an object (other than the one or more distance measurement sensors themselves, and other than any vehicle 102 or other device that the one or more distance measurement sensors may in some cases be coupled to) within the voxelized model. In some cases, detecting the object within the voxelized model includes identifying an object category of the object, the object category being one of several object categories. For example, the system may detect an object and further identify, using an object recognition algorithm, that the object is a pedestrian, a bicycle and/or bicyclist, a motorcycle and/or motorcyclist, a car, a bus, a truck, another type of vehicle, a tree, another type of plant, a building, a bridge, a lane divider, or some other object category of object.

The system may identify the object category of the object using an object recognition algorithm, such as a object classifier, that may be based on a machine learning algorithm. The machine learning algorithm may be trained using training data that is based on previous inputs (e.g., distance measurements and/or 3D point clouds and/or 3D voxelized models) from the one or more distance measurement sensors of the process 300, from one or more similar distance measurement sensors, or a combination thereof. For instance, if the one or more distance measurement sensors of the process 300 are coupled to a vehicle 102, the one or more similar distance measurement sensors may be coupled to a similar vehicle or similar device. These previous inputs are turned into 3D point clouds and then into voxelized models if they are not in this form already. The machine learning algorithm may be a neural network, such as a multi-layer perceptron (MLP), a convolutional neural network (CNN), a time-delay neural network (TDNN), a recurrent neural network (RNN), or some combination thereof. The algorithm may build a predictive model for classifying objects into the different object categories.

The different object categories may be provided before training the machine learning algorithm. The machine learning algorithm may be trained using training data that may include 3D voxelized models, or that may include distance measurements and/or 3D point clouds from which 3D voxelized models may be generated. The training data may be pre-classified to identify known locations of cars, pedestrians, trees, bicycles/bicyclists, and so forth within the voxelized models (and/or 3D point clouds). Thus, if the machine learning algorithm is trained using multiple voxel patterns that it knows correspond to cars, the machine learning algorithm may generate a model through which it may recognize that a voxel pattern is similar to the voxel patterns that it knows correspond to cars, and may identify that the voxel pattern therefore corresponds to a car. The training data may also be reversed and/or flipped and/or rotated along multiple axes and fed into the machine learning algorithm, so that the machine learning algorithm can recognize a car (or any other object) regardless of its orientation relative to the one or more distance measurement sensors.

After training, the machine learning algorithm may in some cases perform a validation procedure using a validation dataset with some pre-classified objects as well. Like the training data, the validation data be based on previous inputs (e.g., distance measurements and/or 3D point clouds and/or 3D voxelized models) from the one or more distance measurement sensors of the process 300, from one or more similar distance measurement sensors, or a combination thereof. For instance, if the one or more distance measurement sensors of the process 300 are coupled to a vehicle 102, the one or more similar distance measurement sensors may be coupled to a similar vehicle or similar device. These previous inputs are turned into 3D point clouds and then into voxelized models if they are not in this form already. The validation data may be pre-classified to identify known locations of cars, pedestrians, trees, bicycles/bicyclists, and so forth within the voxelized models (and/or 3D point clouds). During the validation procedure, the machine learning algorithm may detect objects within the voxelized models (and/or 3D point clouds) of the validation data, and then may compare its detection and classification against the pre-classified objects. If these match, the machine learning algorithm may do nothing, or may identify that this detection and classification is accurate, and assign it a higher weight or confidence score. If these do not match, the machine learning algorithm may modify its model based on the pre-classification, or may reduce the weight and/or confidence score of its previous detection and/or classification.

In some cases, the system may filter certain points out of the three-dimensional point cloud, may filter certain voxels out of the voxelized model, or both. For example, if the one or more distance measurement sensors are coupled to a vehicle 102, then in some cases, the system may filter out points and/or voxels corresponding to a road upon which the vehicle 102 drives and/or points and/or voxels corresponding to the vehicle 102 itself. In some cases, the system may filter out points and/or voxels corresponding to plants, trees, or other vegetation. In this way, the system may prioritize more important objects that are more likely to result in a vehicular accident. In other cases, roads are not filtered out, allowing the system to recognize potholes, snow on the road, or other road irregularities, for example.

In some cases, the system may determine a bounding box for the detected object to identify general boundaries of the detected object. If the one or more distance measurement sensors are coupled to a vehicle 102, these boundaries may be used by the vehicle 102 to then avoid the object, for example to route and/or navigate and/or drive the vehicle 102 around the bounding box corresponding to the detected object. In particular, an internal computing device 110 of the vehicle 102 may generate a route that avoids the detected object, where for example the route avoids the bounding box or another type of boundary of the detected object. The bounding box may be determined using an object detection algorithm, an object recognition algorithm, an edge detection algorithm, a bounding box algorithm, or some combination thereof. In some cases, the bounding box may be determined using at least a non-maximum suppression algorithm.

In some cases, the vehicle may also include one or more cameras (e.g., one or more visual light cameras and/or one or more thermal/IR cameras) in its suite of sensors 180. In some cases, machine learning model may use a combination of image data from the one or more cameras and 3D data from the 3D point cloud and/or voxelized model to perform object detection/recognition. The object detection/recognition algorithm may use various edge detection and/or image object recognition algorithms for the camera image data, which may include any of the machine learning algorithms discussed above, which may use pre-classified training data and/or pre-classified verification data from similar vehicle cameras as discussed above. For example, if the object recognition algorithm detects an object within the camera image data (e.g., detects an edge/border around the object) that looks like a pedestrian, and the object recognition algorithm detects a cluster of voxels in the voxelized model in the same general location matching the a voxel pattern corresponding to a pedestrian, then the object recognition algorithm may have a high degree of confidence that a pedestrian is present in that location. On the other hand, if the object recognition algorithm fails to detect an object in the camera image data that the object recognition algorithm detects in the voxelized model, or vice versa, the object recognition algorithm may have a lower degree of confidence that an object is present in that location. Similarly, if the object recognition algorithm detect one category of object (e.g., a tree) in the camera image data, and the object recognition algorithm detects a different category of object (e.g., a car) at the same location in the voxelized model, then object recognition algorithm may have a high degree of confidence that an object is present at that location, but a low degree of confidence in the object category of that object.

Figure 4:
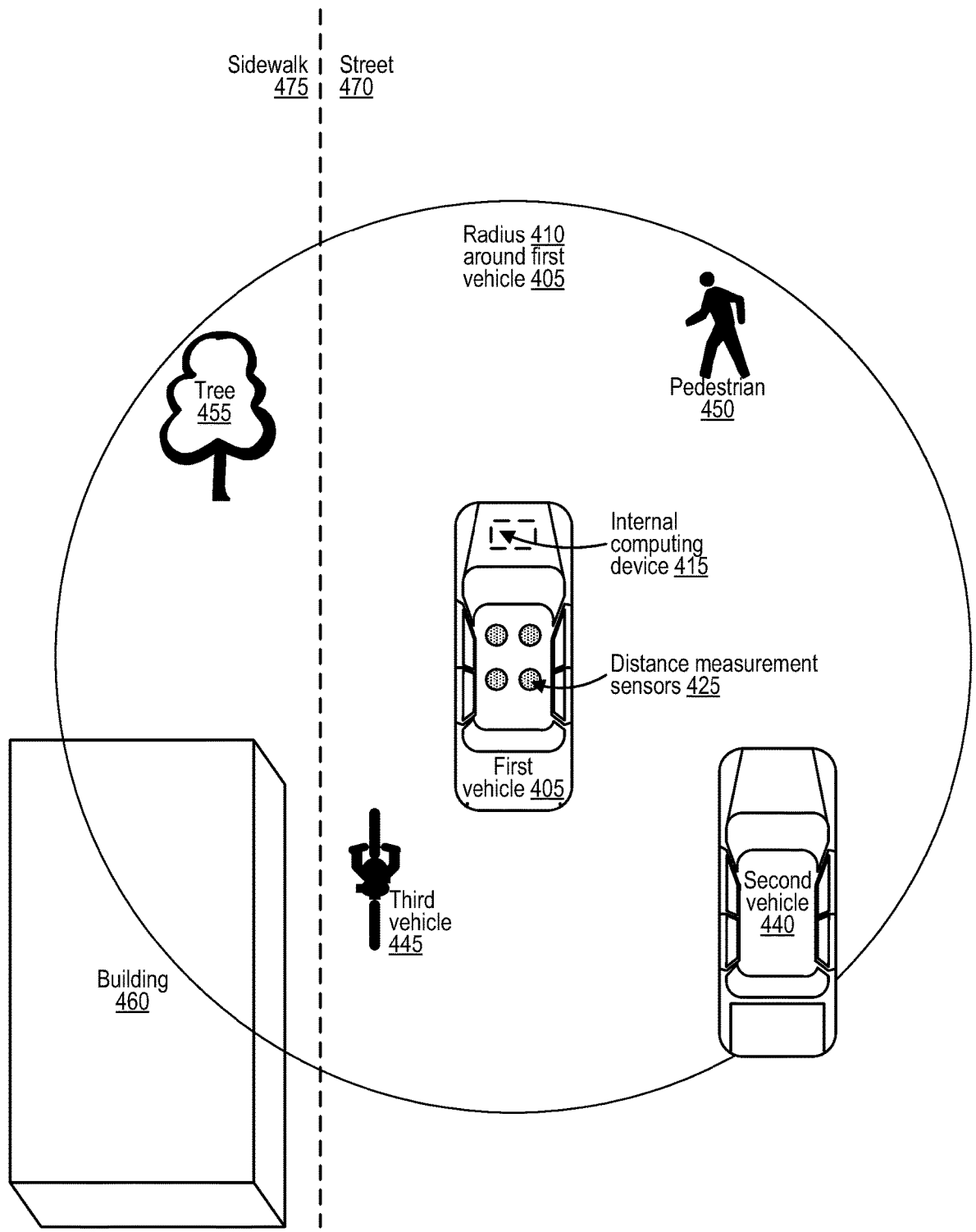
FIG. 4 illustrates a vehicle with distance measurement sensors of a known range in an environment with multiple objects.

FIG. 4 illustrates a vehicle with distance measurement sensors of a known range in an environment with multiple objects.

In particular, FIG. 4 illustrates a first vehicle 405 with an internal computing device 415 (illustrated as a box with a dashed outline) and four distance measurement sensors 425 (illustrated as shaded circles). The first vehicle 405 may be an autonomous vehicle 102 as in FIG. 1. The internal computing device 415 may be an internal computing device 110 as in FIG. 1, or a computing device 800 as in FIG. 8, a subset thereof, multiple thereof, or a combination thereof. The distance measurement sensors 425 may be at least a subset of the sensors 180 of the vehicle 405.

A radius 410 is illustrated around the first vehicle 405, representing a range associated with the distance measurement sensors 425. A dashed line runs through the radius 410, with street 470 on the right of the dashed line and sidewalk 475 on the left of the dashed line. On the street 470, a second vehicle 440 (a car), a third vehicle 445 (a bicycle and bicyclist), and a pedestrian 450 are within the radius 410. On the sidewalk 475, a tree 455 and a building 460 are within the radius 410.

Figure 5:
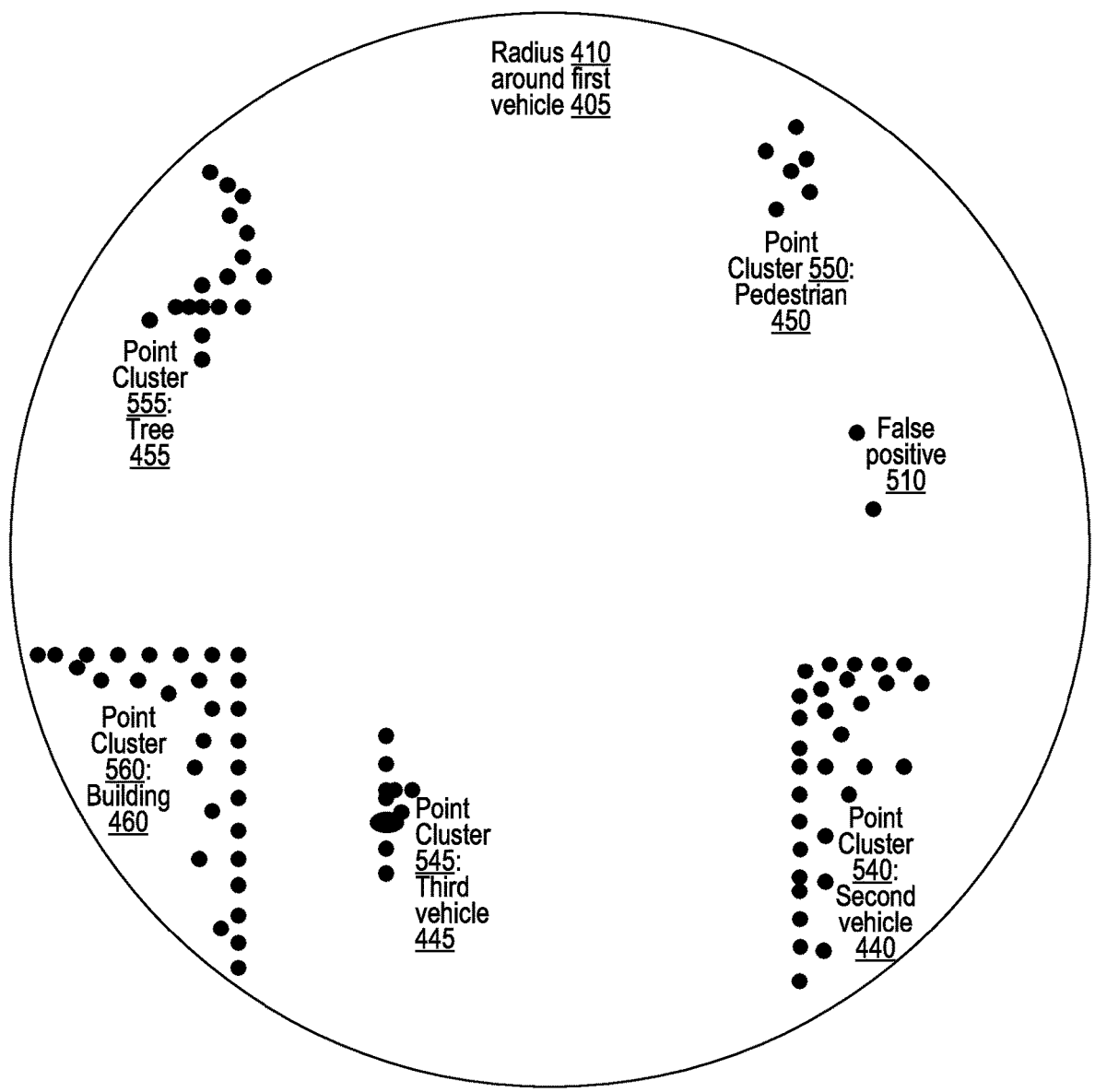
FIG. 5 illustrates a representation of a point cloud generated using distance measurements from the distance measurement sensors of FIG. 4, with groups of points in the point cloud labeled as representing the objects of FIG. 4.

FIG. 5 illustrates a representation of a point cloud generated using distance measurements from the distance measurement sensors of FIG. 4, with groups of points in the point cloud labeled as representing the objects of FIG. 4.

The radius 410 is still shown in FIG. 5, but the first vehicle 405 is no longer visible in FIG. 5, as any points corresponding to the first vehicle 405 have been filtered out. Likewise, any points corresponding to the road have been filtered out.

A cluster of points 550 is located in the same general location as the pedestrian 450 was in FIG. 4. Thus, that cluster of points 550 represents the pedestrian 450. A cluster of points 540 is located in the same general location as the second vehicle (car) 440 was in FIG. 4. Thus, that cluster of points 540 represents the second vehicle (car) 440. A cluster of points 545 is located in the same general location as the third vehicle (bicycle and bicyclist) 445 was in FIG. 4. Thus, that cluster of points 545 represents the third vehicle (bicycle and bicyclist) 445. A cluster of points 555 is located in the same general location as the tree 455 was in FIG. 4. Thus, that cluster of points 555 represents the tree 455. A cluster of points 560 is located in the same general location as the building 460 was in FIG. 4. Thus, that cluster of points 560 represents the tree 460.

In some cases, distance measurement sensors may only be able to detect portions of an object that are closest to the distance measurement sensors. Those portions may then occlude farther portions of the object, since the closer portions of the object already reflected the signals from the distance measurement sensors back to the distance measurement sensors. Thus, the cluster 540 representing the second vehicle (car) 440 has many points along the top and left sides of the second vehicle (car) 440, but does not have many points along the bottom and right sides of the second vehicle (car) 440, since signals from the distance measurement sensors 425 of the first vehicle 405 generally reflect off of the top and left sides of the second vehicle (car) 440 and do not reach the bottom and right sides of the second vehicle (car) 440. In converting the point cloud of FIG. 5 to the voxelized model of FIG. 6 or FIG. 7, the internal computing device 415 of the vehicle 405 may use the object recognition model to determine that this cluster 540 is likely to be a car, and may then "fill in" voxels for the portions without points in the point cloud based on this classification. Likewise, the cluster 560 representing the building 460 has many points along the top and right sides of the building 460, but does not have many points along the bottom and left sides of the building 460, since signals from the distance measurement sensors 425 of the first vehicle 405 generally reflect off of the top and right sides of the building 460 and do not reach the bottom and left sides of the building 460. In converting the point cloud of FIG. 5 to the voxelized model of FIG. 6 or FIG. 7, the internal computing device 415 of the vehicle 405 may use the object recognition model to determine that this cluster 560 is likely to be a building, and may then "fill in" voxels for the portions without points in the point cloud based on this classification.

The point cloud of FIG. 5 also includes two points were nothing exists. These points represent a false positive 510, and should therefore be filtered out and not be converted into a voxel in the voxelized model of FIG. 6 or FIG. 7.

Figure 6:
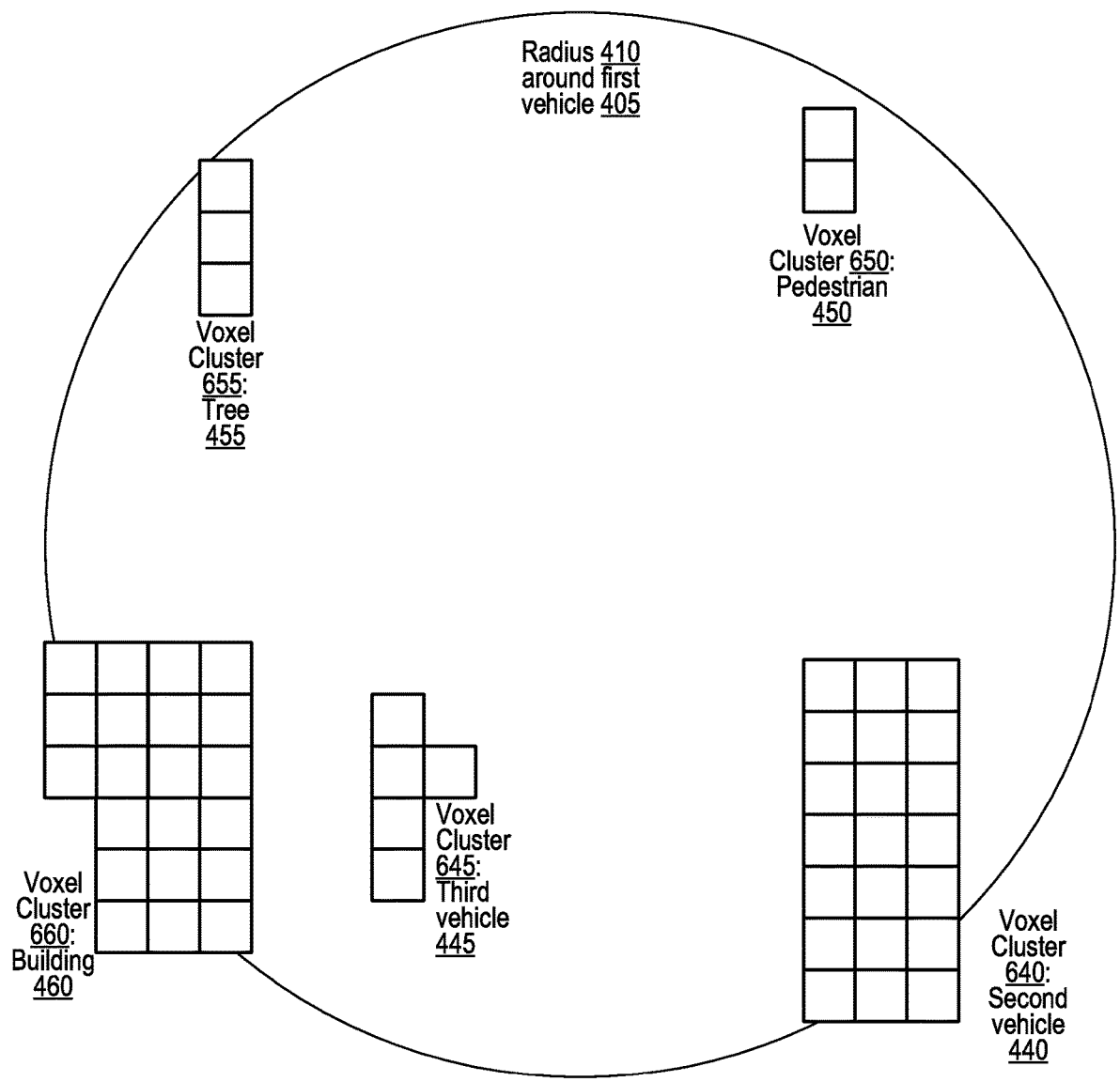
FIG. 6 illustrates a two-dimensional top-down representation of a voxelized model generated using the point cloud of FIG. 5, with groups of voxels in the voxelized model labeled as representing the objects of FIG. 4.

FIG. 6 illustrates a two-dimensional top-down representation of a voxelized model generated using the point cloud of FIG. 5, with groups of voxels in the voxelized model labeled as representing the objects of FIG. 4.

The voxels of the voxelized model of FIG. 6 are illustrated a squares, since this is a two-dimensional top-down representation of the voxelized model. In other voxelized models, the voxels might look like oblong (non-sqivare) rectangles or other polygons in the two-dimensional top-down representation.

The radius 410 is still shown in FIG. 6, but the first vehicle 405 is no longer visible in FIG. 6, as any points (and therefore voxels) corresponding to the first vehicle 405 have been filtered out. Likewise, any points (and therefore voxels) corresponding to the road have been filtered out.

A cluster of voxels 650 is located in the same general location as the pedestrian 450 was in FIG. 4. Thus, that cluster of voxels 650 represents the pedestrian 450. A cluster of voxels 640 is located in the same general location as the second vehicle (car) 440 was in FIG. 4. Thus, that cluster of voxels 640 represents the second vehicle (car) 440. A cluster of voxels 645 is located in the same general location as the third vehicle (bicycle and bicyclist) 445 was in FIG. 4. Thus, that cluster of voxels 645 represents the third vehicle (bicycle and bicyclist) 445. A cluster of voxels 655 is located in the same general location as the tree 455 was in FIG. 4. Thus, that cluster of voxels 655 represents the tree 455. A cluster of voxels 660 is located in the same general location as the building 460 was in FIG. 4. Thus, that cluster of voxels 660 represents the tree 460.

Figure 7:
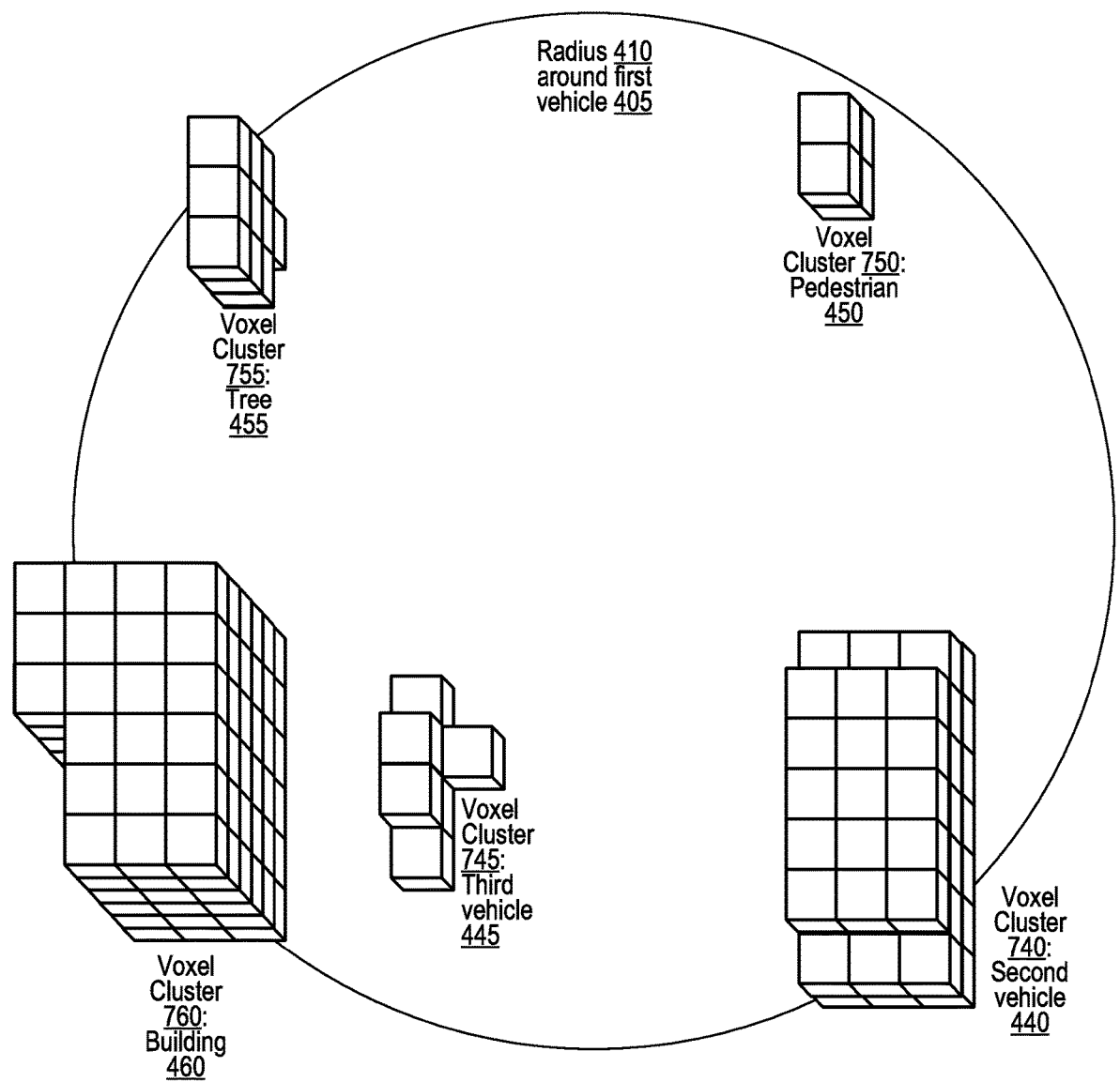
FIG. 7 illustrates a three-dimensional perspective representation of the voxelized model of FIG. 6 generated using the point cloud of FIG. 5, with groups of voxels in the voxelized model labeled as representing the objects of FIG. 4.

FIG. 7 illustrates a three-dimensional perspective representation of the voxelized model of FIG. 6 generated using the point cloud of FIG. 5, with groups of voxels in the voxelized model labeled as representing the objects of FIG. 4.

The voxels of the voxelized model of FIG. 7 are illustrated a cubes. In other voxelized models, the voxels might be oblong (non-cubic) rectangular prisms or other polyhedrons.

The radius 410 is still shown in FIG. 7, but the first vehicle 405 is no longer visible in FIG. 7, as any points (and therefore voxels) corresponding to the first vehicle 405 have been filtered out. Likewise, any points (and therefore voxels) corresponding to the road have been filtered out.

A cluster of voxels 750 is located in the same general location as the pedestrian 450 was in FIG. 4. Thus, that cluster of voxels 750 represents the pedestrian 450. A cluster of voxels 740 is located in the same general location as the second vehicle (car) 440 was in FIG. 4. Thus, that cluster of voxels 740 represents the second vehicle (car) 440. A cluster of voxels 745 is located in the same general location as the third vehicle (bicycle and bicyclist) 445 was in FIG. 4. Thus, that cluster of voxels 745 represents the third vehicle (bicycle and bicyclist) 445. A cluster of voxels 755 is located in the same general location as the tree 455 was in FIG. 4. Thus, that cluster of voxels 755 represents the tree 455. A cluster of voxels 760 is located in the same general location as the building 460 was in FIG. 4. Thus, that cluster of voxels 760 represents the tree 460.

In some cases, the internal computing device 415 of the first vehicle 405 may generate a plurality of images corresponding to a plurality of elevations based on the voxelized model. Each image of the plurality of images represents a two-dimensional planar portion of the voxelized model at one elevation of the plurality of elevations. Each image of the plurality of images may, in some cases, represent a top-down view of the two-dimensional planar portion of the volume of space within the radius 410 around the first vehicle 405. For example, in the context of FIG. 4, the image at the lowest elevation would only show one voxel at the location of the voxel cluster 755 representing the tree 455, since at the lowest elevation that voxel cluster 755 only has one voxel. The images at the next two elevations up would show three voxels at the location of the voxel cluster 755 representing the tree 455, since at those two elevation levels, that voxel cluster 755 has three voxels. The images at the any further elevations up would show no voxels at the location of the voxel cluster 755 representing the tree 455, since the voxel cluster 755 is only three voxels in height.

In some cases, detecting the object within the voxelized model (as in step 320 of FIG. 3) may be based on at least a subset of the plurality of images generated in this way. That is, the images may be generated, and these images may be the input into the machine learning algorithm to detect and/or classify objects based on as otherwise discussed with respect to step 320. Likewise, training data and/or validation data may include such images.

FIG. 8 shows an example of computing system 800, which can be for example any computing device making up internal computing system 110, remote computing system 150, a passenger device executing the rideshare app 170, internal computing device 230, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A method of object detection, the method comprising:
   receiving a plurality of distance measurements from one or more distance measurement sensors;
   generating a three-dimensional point cloud including a plurality of points in a volume of space within a radius around the one or more distance measurement sensors, wherein each of the plurality of points in the three-dimensional point cloud corresponds to one of the plurality of distance measurements;
   generating a voxelized model of the volume of space based on the three-dimensional point cloud, the voxelized model including a plurality of voxels positioned based on the plurality of points in the three-dimensional point cloud;
   generating a plurality of images corresponding to a plurality of elevations based on the voxelized model, wherein each image of the plurality of images represents a two-dimensional planar portion of the voxelized model at one elevation of the plurality of elevations; and
   detecting an object other than the one or more distance measurement sensors within the voxelized model based on at least a subset of the plurality of images.

2. The method of claim 1, wherein the one or more distance measurement sensors include one or more light detection and ranging (LIDAR) sensors.

3. The method of claim 1, wherein the one or more distance measurement sensors include one or more radio detection and ranging (RADAR) sensors.

4. The method of claim 1, wherein the one or more distance measurement sensors include at least one of a sound detection and ranging (SODAR) sensor or a sound navigation and ranging (SONAR) sensor.

5. The method of claim 1, wherein each image of the plurality of images represents a top-down view of the two-dimensional planar portion of the volume of space within the radius around the one or more distance measurement sensors.

6. The method of claim 1, wherein each of the plurality of voxels is a three-dimensional polyhedral shape.

7. The method of claim 1, wherein detecting the object within the voxelized model includes identifying an object category of the object, wherein the object category is one of a plurality of object categories.

8. The method of claim 1, wherein the one or more distance measurement sensors are coupled to a vehicle, wherein detecting the object other than the one or more distance measurement sensors within the voxelized model includes detecting the object other than the vehicle within the voxelized model, further comprising autonomously navigating the vehicle to avoid the object.

9. The method of claim 1, wherein the plurality of distance measurements from the one or more distance measurement sensors includes a first plurality of distance measurements from a first distance measurement sensor and a second plurality of distance measurements from a second distance measurement sensor, further comprising:
generating a first three-dimensional point cloud including a first plurality of points in the volume of space within the radius around the one or more distance measurement sensors, wherein each of the first plurality of points in the first three-dimensional point cloud corresponds to one of the first plurality of distance measurements; and
generating a second three-dimensional point cloud including a second plurality of points in the volume of space within the radius around the one or more distance measurement sensors, wherein each of the second plurality of points in the second three-dimensional point cloud corresponds to one of the second plurality of distance measurements;
wherein generating the three-dimensional point cloud includes combining at least the first three-dimensional point cloud and the second three-dimensional point cloud into the three-dimensional point cloud such that the plurality of points in the three-dimensional point cloud includes the first plurality of points and the second plurality of points.

10. A system for object detection, the system comprising:
one or more distance measurement sensors that measure a plurality of distance measurements;
a memory storing instructions; and
a processor that executes the instructions, wherein execution of the instructions by the processor causes the processor to:
receive the plurality of distance measurements from the one or more distance measurement sensors,
generate a three-dimensional point cloud including a plurality of points in a volume of space within a radius around the one or more distance measurement sensors, wherein each of the plurality of points in the three-dimensional point cloud corresponds to one of the plurality of distance measurements,
generate a voxelized model of the volume of space based on the three-dimensional point cloud, the voxelized model including a plurality of voxels positioned based on the plurality of points in the three-dimensional point cloud,
generate a plurality of images corresponding to a plurality of elevations based on the voxelized model, wherein each image of the plurality of images represents a two-dimensional planar portion of the voxelized model at one elevation of the plurality of elevations, and
detect an object other than the one or more distance measurement sensors within the voxelized model based on at least a subset of the plurality of images.

11. The system of claim 10, wherein the one or more distance measurement sensors include one or more light detection and ranging (LIDAR) sensors.

12. The system of claim 10, wherein the one or more distance measurement sensors include one or more radio detection and ranging (RADAR) sensors.

13. The system of claim 10, wherein the one or more distance measurement sensors include at least one of a sound detection and ranging (SODAR) sensor or a sound navigation and ranging (SONAR) sensor.

14. The system of claim 10, wherein each of the plurality of voxels is a three-dimensional polyhedral shape.

15. The system of claim 10, wherein detecting the object within the voxelized model includes identifying an object category of the object, wherein the object category is one of a plurality of object categories.

16. The system of claim 10, wherein the one or more distance measurement sensors are coupled to a vehicle, wherein detecting the object other than the one or more distance measurement sensors within the voxelized model includes detecting the object other than the vehicle within the voxelized model, further comprising a vehicle navigation system that autonomously navigates the vehicle to avoid the object in response to detection of the object.

17. The system of claim 10, wherein the plurality of distance measurements from the one or more distance measurement sensors includes a first plurality of distance measurements from a first distance measurement sensor and a second plurality of distance measurements from a second distance measurement sensor, wherein execution of the instructions by the processor causes the processor to further:
generate a first three-dimensional point cloud including a first plurality of points in the volume of space within the radius around the one or more distance measurement sensors, wherein each of the first plurality of points in the first three-dimensional point cloud corresponds to one of the first plurality of distance measurements, and
generate a second three-dimensional point cloud including a second plurality of points in the volume of space within the radius around the one or more distance measurement sensors, wherein each of the second plurality of points in the second three-dimensional point cloud corresponds to one of the second plurality of distance measurements,
wherein generating the three-dimensional point cloud includes combining at least the first three-dimensional point cloud and the second three-dimensional point cloud into the three-dimensional point cloud such that the plurality of points in the three-dimensional point cloud includes the first plurality of points and the second plurality of points.

18. A non-transitory computer readable storage medium having embodied thereon a program, wherein the program is executable by a processor to perform a method of object detection, the method comprising:
receiving a plurality of distance measurements from one or more distance measurement sensors;
generating a three-dimensional point cloud including a plurality of points in a volume of space within a radius around the one or more distance measurement sensors, wherein each of the plurality of points in the three-dimensional point cloud corresponds to one of the plurality of distance measurements;
generating a voxelized model of the volume of space based on the three-dimensional point cloud, the voxelized model including a plurality of voxels positioned based on the plurality of points in the three-dimensional point cloud;

generating a plurality of images corresponding to a plurality of elevations based on the voxelized model, wherein each image of the plurality of images represents a two-dimensional planar portion of the voxelized model at one elevation of the plurality of elevations; and detecting an object other than the one or more distance measurement sensors within the voxelized model based on at least a subset of the plurality of images.

19. The system of claim 10, wherein each image of the plurality of images represents a top-down view of the two-dimensional planar portion of the volume of space within the radius around the one or more distance measurement sensors.

* * * * *